US007679686B2

(12) United States Patent
Zhang et al.

(10) Patent No.: US 7,679,686 B2
(45) Date of Patent: Mar. 16, 2010

(54) ELECTRONIC DEVICE COMPRISING A GAMMA CORRECTION UNIT, A PROCESS FOR USING THE ELECTRONIC DEVICE, AND A DATA PROCESSING SYSTEM READABLE MEDIUM

(75) Inventors: Weixiao Zhang, Goleta, CA (US); Zhining Chen, Goleta, CA (US); Gang Yu, Santa Barbara, CA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1136 days.

(21) Appl. No.: 11/045,193

(22) Filed: Jan. 28, 2005

(65) Prior Publication Data

US 2006/0145972 A1 Jul. 6, 2006

Related U.S. Application Data

(60) Provisional application No. 60/640,889, filed on Dec. 30, 2004.

(51) Int. Cl.
*H04N 5/202* (2006.01)

(52) U.S. Cl. ....................... 348/674; 348/254; 348/572; 348/675

(58) Field of Classification Search ......... 348/674–675, 348/254, 255, 800–802, 790, 572, 797, 799; 345/100, 690, 211, 77; *H04N 5/202*
See application file for complete search history.

(56) References Cited

U.S. PATENT DOCUMENTS

| | | | | |
|---|---|---|---|---|
| 5,900,918 | A | 5/1999 | White | 348/674 |
| 6,812,650 | B2 | 11/2004 | Yasuda et al. | |
| 6,919,691 | B2 | 7/2005 | Mizukoshi et al. | |
| 7,038,721 | B2 * | 5/2006 | Stessen et al. | 348/254 |
| 7,286,104 | B2 * | 10/2007 | Sempel et al. | 345/77 |
| 2001/0008429 | A1 | 7/2001 | Arimuzu | 348/674 |
| 2003/0156226 | A1 | 8/2003 | Stessen | 348/674 |
| 2004/0036705 | A1 * | 2/2004 | Jung et al. | 345/690 |
| 2004/0164938 | A1 | 8/2004 | Choi et al. | |
| 2004/0174368 | A1 | 9/2004 | Sempel et al. | |
| 2004/0201582 | A1 * | 10/2004 | Mizukoshi et al. | 345/211 |
| 2005/0057482 | A1 * | 3/2005 | Youngblood et al. | 345/100 |
| 2006/0057857 | A1 * | 3/2006 | Fleming et al. | 438/761 |

* cited by examiner

*Primary Examiner*—Trang U Tran

(57) ABSTRACT

An electronic device includes at least one gamma correction unit including a first gamma correction unit. In one embodiment, the first gamma correction unit includes at least one tap that is configured to allow the gamma function for the first gamma correction unit to be changed after the electronic device has been fabricated. In another embodiment, a process for using the electronic device operating the array during a first time period using a first gamma function for the first gamma correction unit. The process also includes changing the first gamma function to a second gamma function. The process further includes operating the array during a second time period using the second gamma function for the first gamma correction unit. A data processing system readable medium has code that includes instructions for carrying out the process.

19 Claims, 10 Drawing Sheets

ELECTRONIC DEVICE COMPRISING A GAMMA CORRECTION UNIT, A PROCESS FOR USING THE ELECTRONIC DEVICE, AND A DATA PROCESSING SYSTEM READABLE MEDIUM

BACKGROUND OF THE INVENTION

1. Field of the Invention

This invention relates in general to electronic devices, and more particularly, to electronic devices comprising gamma correction units, processes for using those electronic devices, and data processing system readable media having code including instructions for carrying out at least a portion of the processes.

2. Description of the Related Art

Organic electronic devices have attracted considerable attention since the early 1990's. Examples of organic electronic devices include Organic Light-Emitting Diodes ("OLEDs"), which include Polymer Light-Emitting Diodes ("PLEDs") and Small Molecule Organic Light-Emitting Diodes ("SMOLEDs"). Display devices, including OLED displays, have played an important role in modern human life. As computing, telecommunications, home entertainment, and networking technologies converge, the display unit will become more important.

In the display area, there are many kinds of technologies including cathode ray tube ("CRT"), liquid crystal display ("LCD"), and so on. LCD technology is dominant in the present flat panel display market. FIG. 1 includes a block diagram of a conventional data driver 100 for use with an LCD display.

FIG. 1 includes a block diagram of the conventional data driver 100. R, G, and B data, from external digital video inputs for Red, Green and Blue electronic components, are received by a data control unit 102 and are routed to a data latch unit 122. An address shift register 104 receives an external enable signal, a shift direction signal, and a shift clock signal. The external enable signal is used to enable the address shift register 104. The shift direction signal controls the shift direction (from scan line 1 to scan line n or from scan line n to scan line 1). The shift clock signal provides a reference timing signal from which activities in the conventional data driver 100 can be coordinated. The data latch unit 122 also receives a latch enable signal and a load signal. The data latch unit 122 may or may not include storage registers. If storage registers are present, data can be transferred from individual data latches to their corresponding storage registers. The latch enable signal is used to enable individual data latches (or storage registers, if present) within the data latch unit 122, and the load signal enables the captured datum for each data latch to be output to digital-to-analog ("D/A") converters 124. The D/A converters 124 also receive a signal from a gamma correction unit 142 and a polarity inverter 144. Outputs from the D/A converters 124 are received by output-signal drivers 126, which can send data along data lines to electronic components within an array of a display. The operation of the data driver 100 is conventional.

Regarding the gamma correction unit 142, displays and printers use a gamma function to better match the intensity of the output to what a user would expect to see or desires. For example, for an image, a gamma correction unit can provide a gamma function that allows the image, as seen by a human on a display or on paper, to match the intensity if the human were present when the image was actually captured (e.g., when the picture was taken). Gamma correction using a gamma function is conventional. The gamma correction unit receives an input signal corresponding to an image and produces an output signal ($V_o$) based in part on the value of gamma as given in Equation 1.

$$\text{Output signal}=(\text{Input signal})^{\gamma} \qquad \text{(Equation 1)}$$

FIG. 2 illustrates a series of lines (straight and curved) for different values of gamma. As can be seen in FIG. 2, a gamma of less than 1 is used for lighter images, and a gamma of greater than 1 is used for darker images.

The value of gamma for the gamma correction unit 142 is set when the gamma correction unit is fabricated and cannot be changed at a later time. Also, the minimum and maximum output values from the gamma correction unit are set when the display or printer is fabricated and are not changed at a later time. Therefore, the gamma function is static.

For organic electroluminescent displays, multiple gamma correction units have been proposed. For example, one gamma correction unit may be dedicated to each color emitter (e.g., red, green, and blue). However, the gamma function is still static and does not change. The problems with the gamma correction unit 142 may be even more of an issue for organic active layers used within radiation-emitting components, as different materials for organic active layers and corresponding thin-film pixel driving circuits may degrade at different rates.

SUMMARY OF THE INVENTION

An electronic device includes at least one gamma correction unit including a first gamma correction unit. In one embodiment, the first gamma correction unit includes at least one tap that is configured to allow the gamma function for the first gamma correction unit to be changed after the electronic device has been fabricated.

In another embodiment, a process is used for an electronic device including an array of radiation-emitting components and a first gamma correction unit. The process includes operating the array during a first time period, wherein a first gamma function for the first gamma correction unit is used during the first time period. The process also includes changing the first gamma function to a second gamma function that is different from the first gamma function. The process further includes operating the array during a second time period, wherein the second gamma function for the first gamma correction unit is used during the second time period.

In still another embodiment, a data processing system readable medium has code for using an electronic device including an array of radiation-emitting components and a first gamma correction unit, wherein the code is embodied within the data processing system readable medium. The code includes an instruction for operating the array during a first time period, wherein a first gamma function for the first gamma correction unit is used during the first time period. The code also includes an instruction for changing the first gamma function to a second gamma function that is different from the first gamma function. The code further includes an instruction for operating the array during a second time period, wherein the second gamma function for the first gamma correction unit is used during the second time period.

The foregoing general description and the following detailed description are exemplary and explanatory only and are not restrictive of the invention, as defined in the appended claims.

BRIEF DESCRIPTION OF THE DRAWINGS

The invention is illustrated by way of example and not limitation in the accompanying figures.

Figure 1:
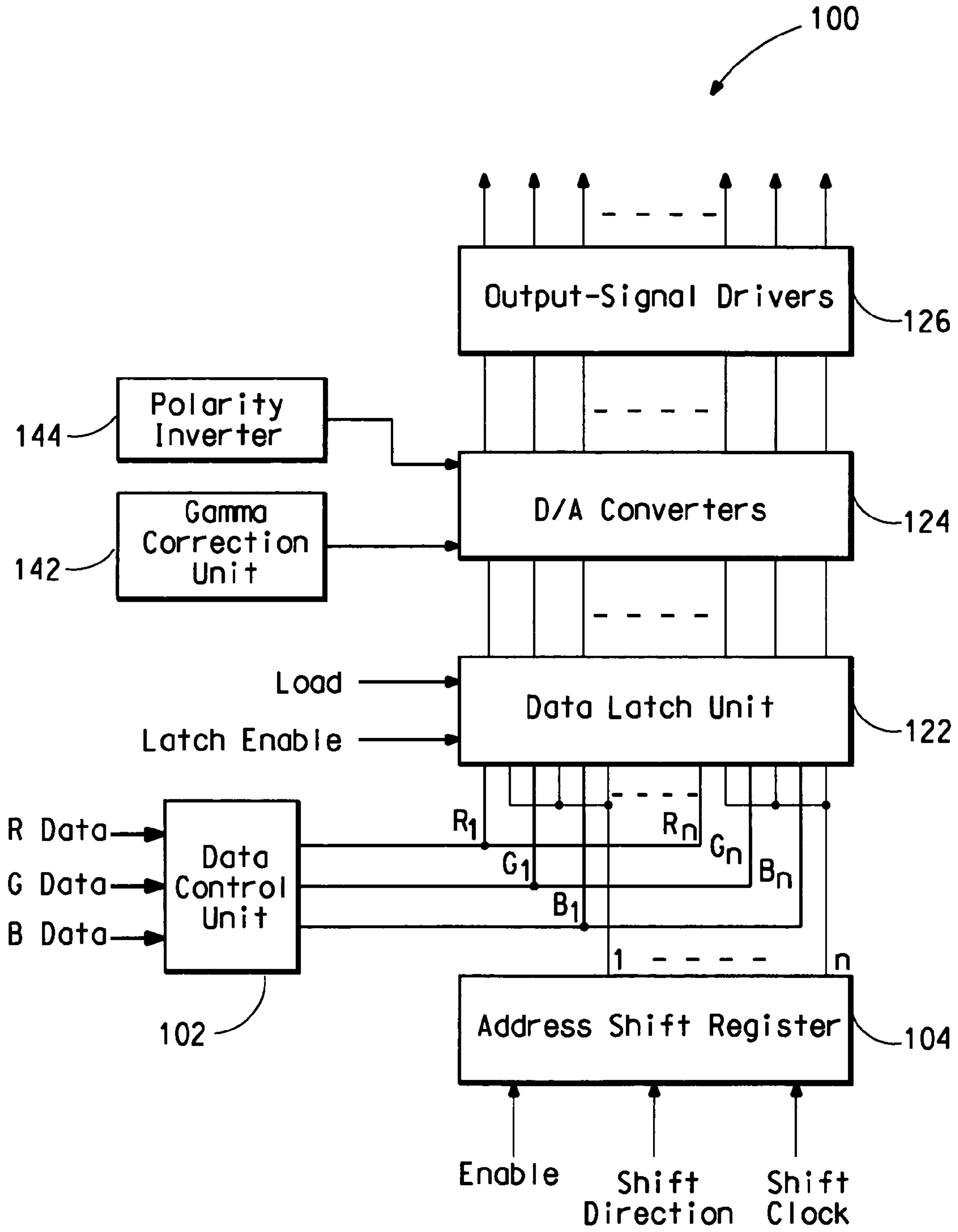
FIG. 1 (PRIOR ART)
FIG. 1 includes a block diagram of a conventional data driver. (Prior art).
Figure 2:
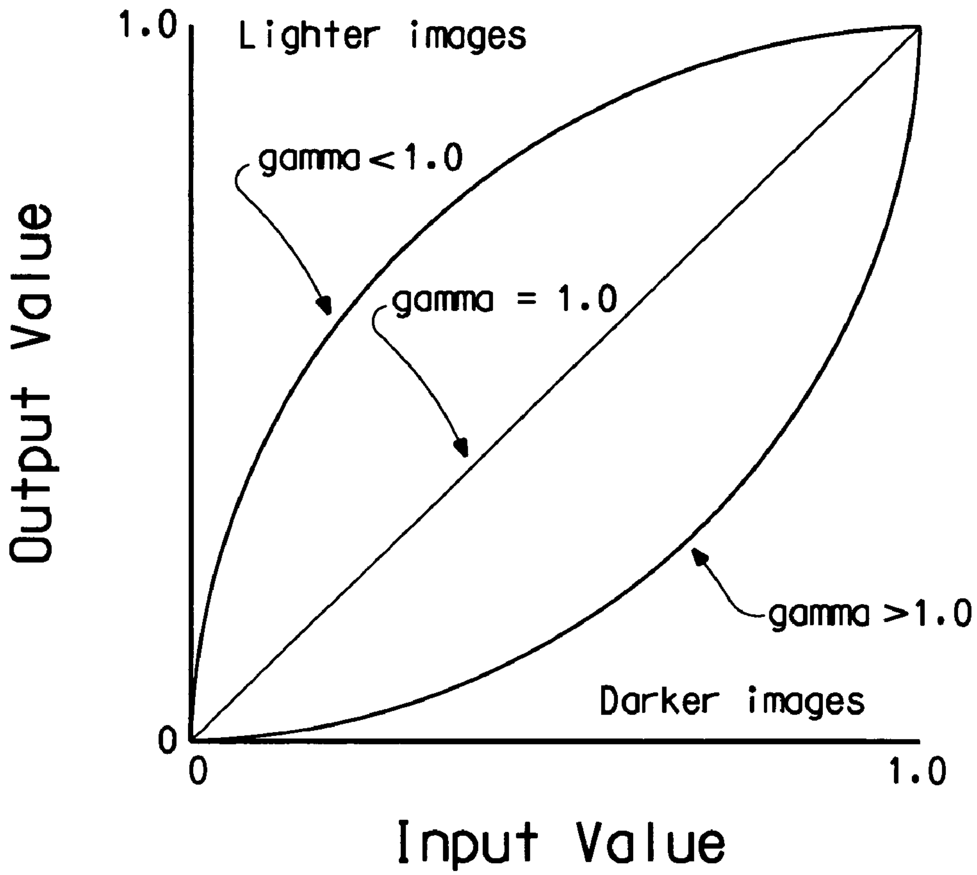
FIG. 2 (PRIOR ART)
FIG. 2 includes an illustration of different gamma functions corresponding to different values of gamma. (Prior art).

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

An electronic device includes at least one gamma correction unit including a first gamma correction unit. In one embodiment, the first gamma correction unit includes at least one tap that is configured to allow the gamma function for the first gamma correction unit to be changed after the electronic device has been fabricated.

In another embodiment, the at least one tap is configured to allow a signal at the tap to be changed by an end user of the electronic device. In still another embodiment, the electronic device is configured to automatically change the signal on the at least one tap.

In yet another embodiment, the first gamma correction unit further includes a first tap and a second tap. The first tap provides a first lowest value for a first output value for the first gamma correction unit, and the second tap that provides a first highest value for the first output value for the first gamma correction unit. The at least one tap includes a third tap that provides a first intermediate value for the first output value for the first gamma correction unit, wherein the first intermediate value is between the first lowest value and the first highest value. The third tap is configured to allow the first intermediate value to be changed after the electronic device has been fabricated.

In a specific embodiment, the at least one tap further includes a fourth tap that provides an additional first intermediate value for the first output value. The additional first intermediate value is between the first lowest value and the first intermediate value of the third tap or is between the first intermediate value of the third tap and the first highest value. The fourth tap is configured to allow the additional first intermediate value to be changed after the electronic device has been fabricated.

In another specific embodiment, the electronic device includes a second gamma correction unit and a third gamma correction unit. The second gamma correction unit includes a fourth tap, a fifth tap, and a sixth tap. The fourth tap provides a second lowest value for a second output value, the fifth tap provides a second highest value for the second output value, and the sixth tap provides a second intermediate value for the second output value, wherein the second intermediate value is between the second lowest value and the second highest value. The sixth tap is configured to allow the second intermediate value to be changed after the electronic device has been fabricated. The third gamma correction unit includes a seventh tap, an eighth tap, and a ninth tap. The seventh tap provides a third lowest value for a third output value, the eighth tap provides a third highest value for the third output value, and the ninth tap provides a third intermediate value for the third output value, wherein the third intermediate value is between the third lowest value and the third highest value. The ninth tap is configured to allow the third intermediate value to be changed after the electronic device has been fabricated.

In a more specific embodiment, the electronic device further includes a first organic active layer corresponding to the first gamma correction unit, a second organic active layer corresponding to the second gamma correction unit, wherein the second organic active layer is different from the first organic active layer, and a third organic active layer corresponding to the third gamma correction unit, wherein the third organic active layer is different from the first organic active layer and the second organic active layer. In another more specific embodiment, the electronic device further includes a D/A converter that is configured to receive the first output value, the second output value, and the third output value.

In an even more specific embodiment, the electronic device further includes a data latch unit coupled to the D/A converter. In an additional even more specific embodiment, the electronic device further includes output signal drivers coupled to the D/A converter. In a further even more specific embodiment, the electronic device further includes an array of radiation-emitting components coupled to the output signal drivers.

In one embodiment, a process is used for an electronic device including an array of radiation-emitting components and a first gamma correction unit. The process includes operating the array during a first time period, wherein a first gamma function for the first gamma correction unit is used during the first time period. The process also includes changing the first gamma function to a second gamma function that is different from the first gamma function. The process further includes operating the array during a second time period, wherein the second gamma function for the first gamma correction unit is used during the second time period.

In another embodiment, changing the first gamma function to the second gamma function is performed by an end user of the electronic device. In still another embodiment, changing the first gamma function to the second gamma function is performed automatically by the electronic device. In still another embodiment, changing the first gamma function to the second gamma function includes changing a lowest value for the first gamma correction unit, a highest value for the first gamma correction unit, a value for gamma for the first gamma correction unit, or a combination thereof.

In a further embodiment, the first gamma correction unit includes a first tap that provides a first lowest value for a first output value, a second tap that provides a first highest value for the first output value, and a third tap that provides a first intermediate value for the first output value, wherein the first intermediate value is between the first lowest value and the first highest value. Changing the first gamma function to the second gamma function includes changing the first intermediate value.

In a more specific embodiment, the first gamma correction unit further includes a fourth tap that provides an additional first intermediate value for the first output value. The additional first intermediate value is between the first lowest value and the first intermediate value of the third tap or is between the first intermediate value of the third tap and the first highest value. In a more specific embodiment, the additional intermediate value is not changed during changing the first gamma function to the second gamma function. In another more specific embodiment, changing the first gamma function to the second gamma function further includes changing the additional first intermediate value.

In yet a further embodiment, the electronic device further includes a second gamma correction unit and a third gamma correction unit. In a specific embodiment, a third gamma function for the second gamma correction unit and a fourth gamma function for the third gamma correction unit are used during the first time period, and the third gamma function for the second gamma correction unit and the fourth gamma function for the third gamma correction unit are used during a second time period. In another specific embodiment, a third gamma function for the second gamma correction unit and a fourth gamma function for the third gamma correction unit are used during the first time period. Changing the first gamma function to the second gamma function further includes changing a third gamma function to a fifth gamma function, the fourth gamma function to a sixth gamma function, or both before operating the array during the second time period.

In still a further embodiment, the electronic device further includes a second gamma correction unit and a third gamma correction unit. The array includes a first organic active layer corresponding to the first gamma correction unit, a second organic active layer corresponding to the second gamma correction unit, wherein the second organic active layer is different from the first organic active layer, and a third organic active layer corresponding to the third gamma correction unit, wherein the third organic active layer is different from the first organic active layer and the second organic active layer.

In one embodiment, a data processing system readable medium has code for using an electronic device including an array of radiation-emitting components and a first gamma correction unit, wherein the code is embodied within the data processing system readable medium. The code includes an instruction for operating the array during a first time period, wherein a first gamma function for the first gamma correction unit is used during the first time period. The code also includes an instruction for changing the first gamma function to a second gamma function that is different from the first gamma function. The code further includes an instruction for operating the array during a second time period, wherein the second gamma function for the first gamma correction unit is used during the second time period.

In another embodiment, the instruction for changing the first gamma function to a second gamma function includes an instruction for changing a lowest value for the first gamma correction unit, a highest value for the first gamma correction unit, a value for gamma for the first gamma correction unit, or a combination thereof.

In still another embodiment, the first gamma correction unit includes a first tap that provides a first lowest value for a first output value, a second tap that provides a first highest value for the first output value, and a third tap that provides a first intermediate value for the first output value, wherein the first intermediate value is between the first lowest value and the first highest value. The instruction for changing the first gamma function to the second gamma function includes an instruction for changing the first intermediate value.

In a specific embodiment, the first gamma correction unit further includes a fourth tap that provides an additional first intermediate value for the first output value. The additional first intermediate value is between the first lowest value and the first intermediate value of the third tap or is between the first intermediate value of the third tap and the first highest value. In a more specific embodiment, the instruction for changing the first gamma function to the second gamma function further includes an instruction for changing the additional first intermediate value.

In yet another embodiment, the electronic device further includes a second gamma correction unit and a third gamma correction unit. In a specific embodiment, a third gamma function for the second gamma correction unit and a fourth gamma function for the third gamma correction unit are used during the first time period. The third gamma function for the second gamma correction unit and the fourth gamma function for the third gamma correction unit are used during the second time period. In another specific embodiment, a third gamma function for the second gamma correction unit and a fourth gamma function for the third gamma correction unit are used during the first time period. The instruction for changing the first gamma function to the second gamma function further includes an instruction for changing the third gamma function to a fifth gamma function, the fourth gamma function to a sixth gamma function, or both is executed before an instruction for operating the array during the second time period.

In still another specific embodiment, the electronic device further includes a second gamma correction unit and a third gamma correction unit. The array includes a first organic active layer corresponding to the first gamma correction unit, a second organic active layer corresponding to the second gamma correction unit, wherein the second organic active layer is different from the first organic active layer, and a third organic active layer corresponding to the third gamma correction unit, wherein the third organic active layer is different from the first organic active layer and the second organic active layer.

In any of the foregoing embodiments, the array is part of a full-color OLED display.

Before addressing details of embodiments described below, some terms are defined or clarified. The term "circuit" is intended to mean a collection of electronic components that collectively, when properly connected and supplied with the proper potential(s), performs a function. A thin film transistor ("TFT") driver circuit for an organic electronic component is an example of a circuit.

The terms "code" is intended to mean a set of symbols for representing one or more instructions that currently are or can be compiled into a form that can be executed by a machine, such as a computer. Source code, object code, and assembly code are examples of different types of code.

The term "connected," with respect to electronic components, circuits, or portions thereof, is intended to mean that two or more electronic components, circuits, or any combination of at least one electronic component and at least one circuit do not have any intervening electronic component lying between them. Parasitic resistance, parasitic capacitance, or both are not considered electronic components for the purposes of this definition. In one embodiment, electronic components are connected when they are electrically shorted to one another and lie at substantially the same voltage. Note that electronic components can be connected together using fiber optic lines to allow optical signals to be transmitted between such electronic components.

The term "coupled" is intended to mean a connection, linking, or association of two or more electronic components, circuits, systems, or any combination of: (1) at least one electronic component, (2) at least one circuit, or (3) at least one system in such a way that a signal (e.g., current, voltage, or optical signal) may be transferred from one to another. A non-limiting example of "coupled" can include a direct connection between electronic component(s), circuit(s) or electronic component(s) or circuit(s) with switch(es) (e.g., transistor(s)) connected between them.

The term "data latch unit" is intended to mean one or more circuits configured to retain data on at least a temporary basis.

The terms "data processing system" is intended to mean one or more components that are configured to process data input in the form of signals (e.g., electronic, electrical, mechanical, electro-mechanical), radiation (e.g., optical, microwave, etc.), or any combination thereof. A data processing system can be a standalone unit (e.g., a personal computer) or a subassembly within a larger system (e.g., a mobile phone).

The terms "data processing system readable medium" is intended to mean a medium that can be read by a data processing system. A computer readable medium is an example of a data processing system readable medium. An example of a data processing system readable medium includes a read-only memory ("ROM"), a random-access memory ("RAM"), a hard disk ("HD"), a database, a storage area network system ("SANS") array, a magnetic tape, a floppy diskette, an optical storage device, a CD ROM, or any combination thereof.

The term "D/A converter" is intended to mean one or more circuits that can convert a digital signal into an analog signal.

The term "electronic component" is intended to mean a lowest level unit of a circuit that performs an electrical or electro-radiative (e.g., electro-optic) function. An electronic component may include a transistor, a diode, a resistor, a capacitor, an inductor, a semiconductor laser, an optical switch, or the like. An electronic component does not include parasitic resistance (e.g., resistance of a wire) or parasitic capacitance (e.g., capacitive coupling between two conductors connected to different electronic components where a capacitor between the conductors is unintended or incidental).

The term "end user" is intended to mean a person that operates or can operate an article, such as an electronic device, after such article has been purchased for consumption. An end user does not include a manufacturer, distributor, retailer, or other reseller that intends to sell or resell the article as new. Note that an end user may, at a later time, resell the article as used or as scrap after the article has been used for its intended purpose(s) for a significant period of time.

The term "fabricate," and its variants, is intended to mean to a process for forming an article, such as an electronic device. Fabrication ends after the article is substantially completed and quality assurance testing, if any, has been performed.

The term "full-color," when referring to an array of radiation-emitting components or display, is intended to mean that such array or display is capable of emitting substantially any or all wavelengths within the visible light spectrum.

The term "gamma" is intended to mean a line, straight or curved, a collection of line segments, or a combination thereof that is used to determine an output of a gamma correction unit in response to an input to the gamma correction unit.

The term "gamma correction reference level" is intended to mean one or more values that can be used to adjust intensity, color balance, or a combination thereof for a display or a portion thereof. The gamma correction reference level can be used interchangeably with an output signal from a gamma correction unit.

The term "gamma correction unit" is intended to mean one or more circuits that receives an input signal and produces a gamma correction reference level as an output signal.

The term "gamma function" is intended to mean a mathematical representation of an output signal from a gamma correction unit that is a function of an input signal to the gamma correction unit.

The term "organic active layer" is intended to mean one or more organic layers, wherein at least one of the organic layers, by itself, or when in contact with a dissimilar material is capable of forming a rectifying junction.

The term "output signal driver" is intended to mean one or more circuits that are used to drive a signal to one or more electronic components within an electronic device. In one embodiment, an output signal driver can amplify a signal before the signal enters an array of electronic components, for example, radiation-emitting components.

The term "radiation-emitting component" is intended to mean an electronic component, which when properly biased, emits radiation at a targeted wavelength or spectrum of wavelengths. The radiation may be within the visible-light spectrum or outside the visible-light spectrum (ultraviolet ("UV") or infrared ("IR")). A light-emitting diode is an example of a radiation-emitting component.

The term "radiation-responsive component" is intended to mean an electronic component which can sense or otherwise respond to radiation at a targeted wavelength or spectrum of wavelengths. The radiation may be within the visible-light spectrum or outside the visible-light spectrum (UV or IR). Photodetectors, IR sensors, biosensors, and photovoltaic cells are examples of radiation-responsive components.

The term "rectifying junction" is intended to mean a junction within a semiconductor layer or a junction formed by an interface between a semiconductor layer and a dissimilar material, in which charge carriers of one type flow easier in one direction through the junction compared to the opposite direction. A pn junction is an example of a rectifying junction that can be used as a diode.

The term "signal" is intended to mean a current, a voltage, an optical signal, or any combination thereof. The signal can be a voltage or current from a power supply or can represent, by itself or in combination with other signal(s), data or other information. An optical signal can be based on one or more pulses, intensities, or a combination thereof. A signal may be substantially constant (e.g., power supply voltages) or may vary over time (e.g., one voltage for on at one time and another voltage for off at another time).

The term "state" is intended to refer to information used for calibration factors at a point in time. For example, the first time an electronic device is calibrated may be an initial state. The second time the electronic device is calibrated may be the most recent state until the next calibration, and the initial state is now the prior state. A third calibration may include data collected for a most recent state, and information collected during the second calibration may now be the prior state.

The term "tap" is intended to refer to a point at which a signal can be provided to or removed from one or more circuits or a portion thereof.

The term "visible light spectrum" is intended to mean a radiation spectrum having wavelengths corresponding to approximately 400-700 nm.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of the "a" or "an" are employed to describe one or more articles to which "a" or "an" refers. Therefore, the description should be read to include one or at least one whenever "a" or "an" is used, and the singular also includes the plural unless it is clear that the contrary is meant otherwise.

Unless otherwise defined, all technical and scientific terms used herein have the same meaning as commonly understood by one of ordinary skill in the art to which this invention belongs. Although suitable methods and materials are described herein for embodiments of the invention, or methods for making or using the same, other methods and materials similar or equivalent to those described can be used without departing from the scope of the invention. All publications, patent applications, patents, and other references mentioned herein are incorporated by reference in their entirety. In case of conflict, the present specification, including definitions, will control. In addition, the materials, methods, and examples are illustrative only and not intended to be limiting.

Group numbers corresponding to columns within the periodic table of the elements use the "New Notation" convention as seen in the CRC Handbook of Chemistry and Physics, 81st Edition (2000).

To the extent not described herein, many details regarding specific materials, processing acts, and circuits are conventional and may be found in textbooks and other sources within the organic light-emitting display, photodetector, semiconductor and microelectronic circuit arts.

2. Exemplary Data Driver

Figure 3:
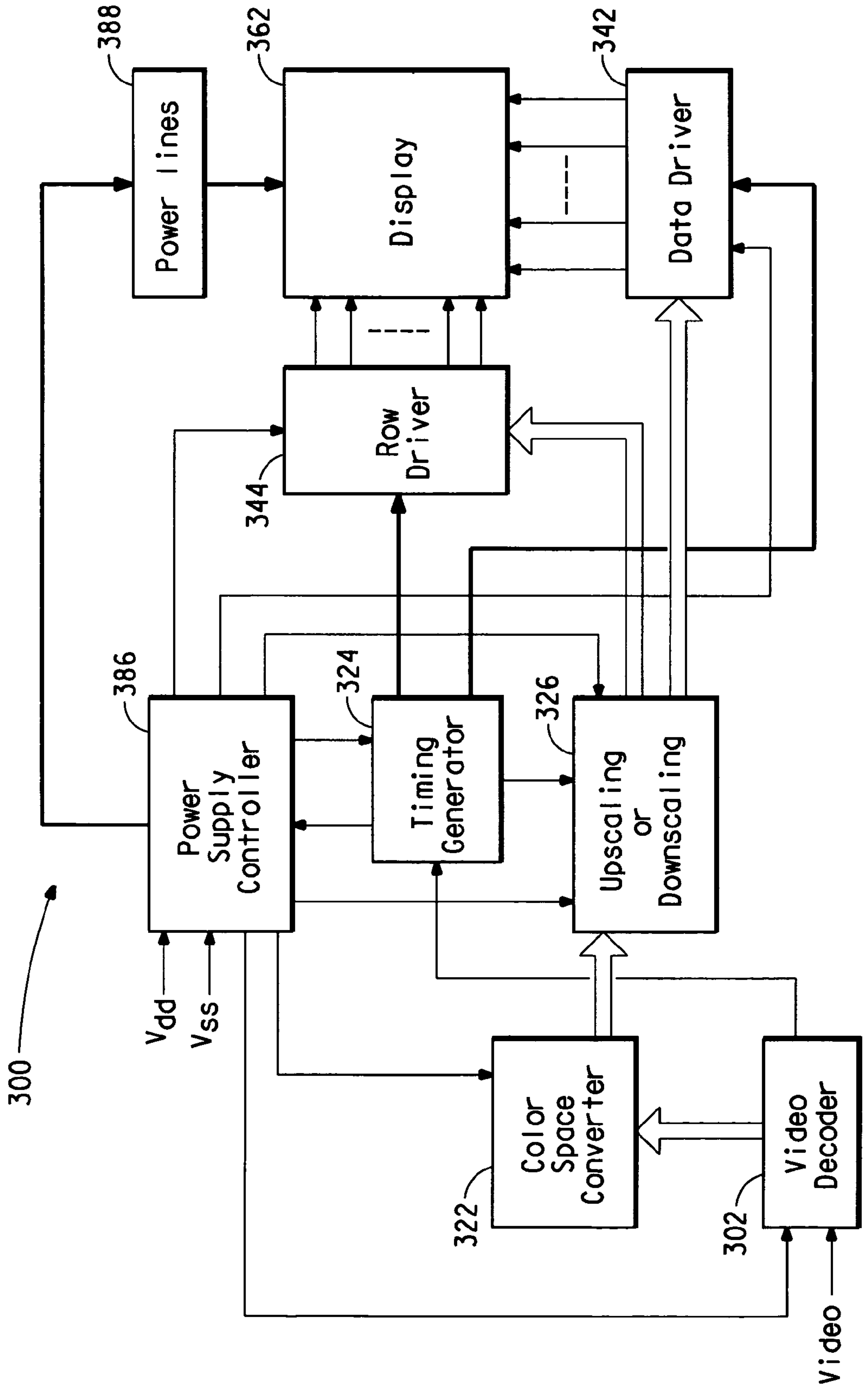
FIG. 3 includes a block diagram of a display system in accordance with one embodiment.

Illustrative, non-limiting hardware embodiments of an electronic device are described before addressing operations of the hardware. FIG. 3 includes a system diagram for an electronic device 300 in accordance with one embodiment. A video decoder 302 is used to decode external video signals (National Television System Committee ("NTSC"), Phase Alternating Line ("PAL"), Sequential Colour Avec Memoire ("SECAM") S-video, etc.). A color space converter 322 changes the external video color format (such as YUV, YCbCr, or other format into RGB format). An upscaling or downscaling unit 326 is used to scale an input format into a suitable display format. A timing generator 324 produces timing signals for the different parts of the display system 300. Power supply controller 386 receives $V_{ss}$ and $V_{dd}$ voltages and provides power for other parts of the electronic device 300, including power lines 388 that are coupled to the display 362. A row driver unit 344 and a data driver unit 342 produce output signals (current or voltage) to turn a display 362 on or off. In one embodiment, the display 362 includes an array of radiation-emitting components. Arrows within FIG. 3 illustrate the routing and principal directions of signals. However, in other embodiments, additional routing, the reverse flow of signals, or bidirectional flows of signals can be used. Other than data driver 342, all other parts of the display system shown in FIG. 3 can be conventional in one embodiment.

Figure 4:
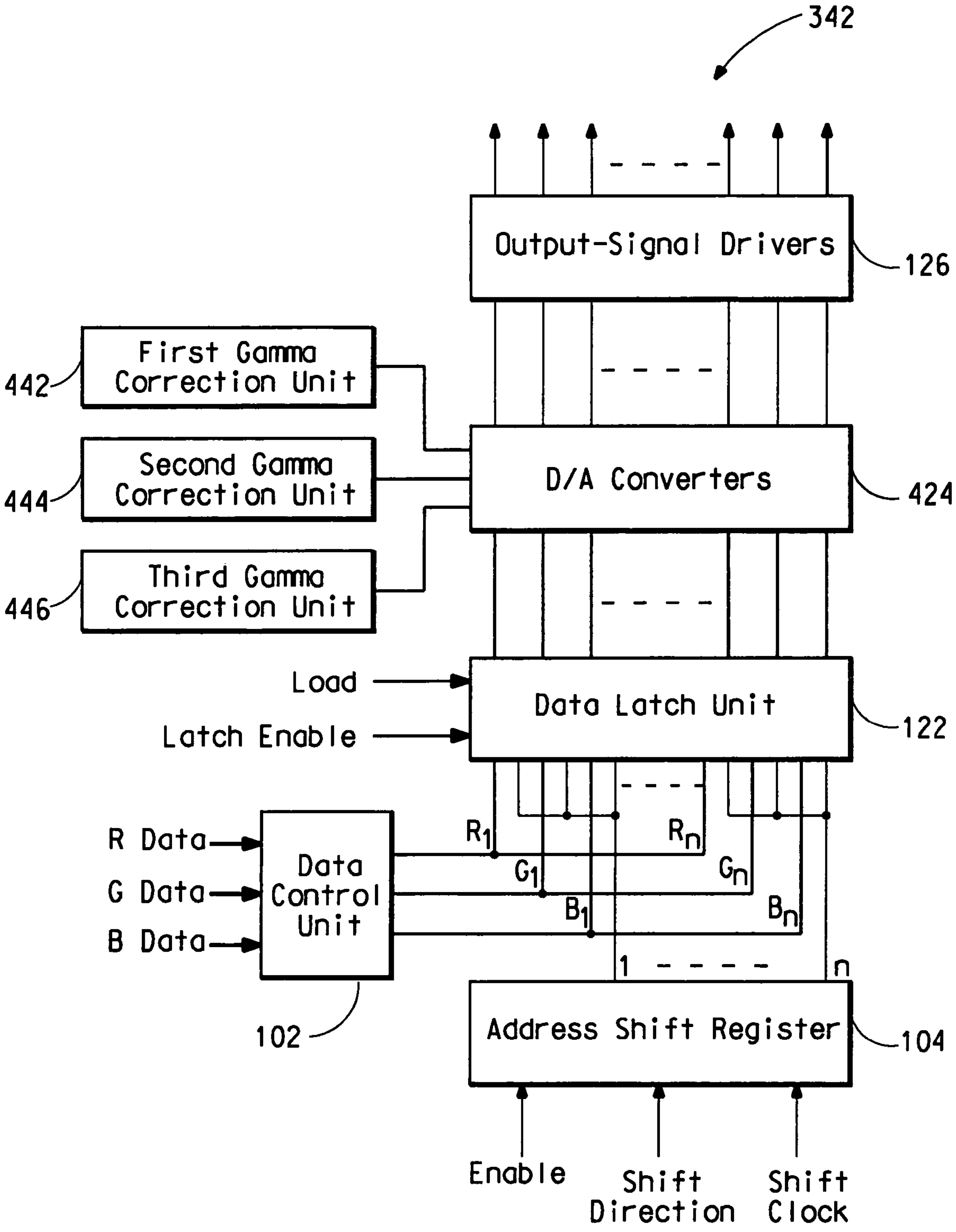
FIG. 4 includes a block diagram of a data driver including gamma correction units.

FIG. 4 includes a block diagram of data driver 342 in accordance with one embodiment. Compare FIG. 1 to FIG. 4. Within one embodiment of data driver 342, each of the data control unit 102, address shift register 104, data latch unit 122, and output-signal drivers 126 are conventional. Unlike FIG. 1, a first gamma correction unit 442, a second gamma correction unit 444, and a third gamma correction unit 446 provide inputs to D/A converters 424. The polarity inverter 144 is not required and is omitted in this embodiment. Other than processing using inputs of the gamma correction units, the structure and operation of the D/A converters 424 is conventional.

In one embodiment, each of the first gamma correction unit 442, second gamma correction unit 444, and third gamma correction unit 446 is dedicated to one type of radiation-emitting components. For example, red radiation-emitting components can include a first organic active layer and correspond to the first gamma correction unit 442. Similarly, green-radiation emitting components can include a second organic active layer and correspond to the second gamma correction unit 444, and blue radiation-emitting components can include a third organic active layer and correspond to the third gamma correction unit 446. Each of the organic active layers can include one or more different materials as compared to the other organic active layers. In one embodiment, any one or more of the organic active layers can include a small molecule organic material or a polymer organic material (which may or may not include a co-polymer), or a combination thereof that are used in the OLED industry.

The first gamma correction unit 442, the second gamma correction unit 444, the third gamma correction unit 446, or any combination thereof is configured to allow the gamma function(s) for the gamma correction unit(s) to be changed at nearly any time. In one embodiment, an end user of the electronic device 300 can change the gamma function(s) for the gamma correction unit(s) as radiation-emitting components, thin-film transistors, or a combination thereof degrade with use. Also, the gamma function for any one of the gamma correction units can be changed independently of the gamma function(s) of the other gamma correction unit(s). Therefore, if electronic components associated with one of the emitters (e.g., blue light-emitting OLEDs and their corresponding thin film transistors) degrade faster than other electronic components (e.g., green light-emitting OLEDs, red light-emitting OLEDs and their corresponding thin film transistors, or any combination thereof, the gamma function can be changed for the difference in degradation rates.

In one embodiment, any one or more of the first, second, and third gamma correction units 442, 444, and 446 can include a D/A converter. The D/A converter can be designed in any one or more of a variety of architectures and technologies, including a weighted-resistor D/A converter, weighted-capacitor D/A converter, potentiometric D/A converter, current-mode R-2R ladder, voltage-mode R-2R ladder, bipolar D/A converter, master-slave D/A converter, current-driven R-2R ladder, voltage-mode segmentation, current-mode segmentation, other convention D/A converter, or any combination thereof.

Figure 5:
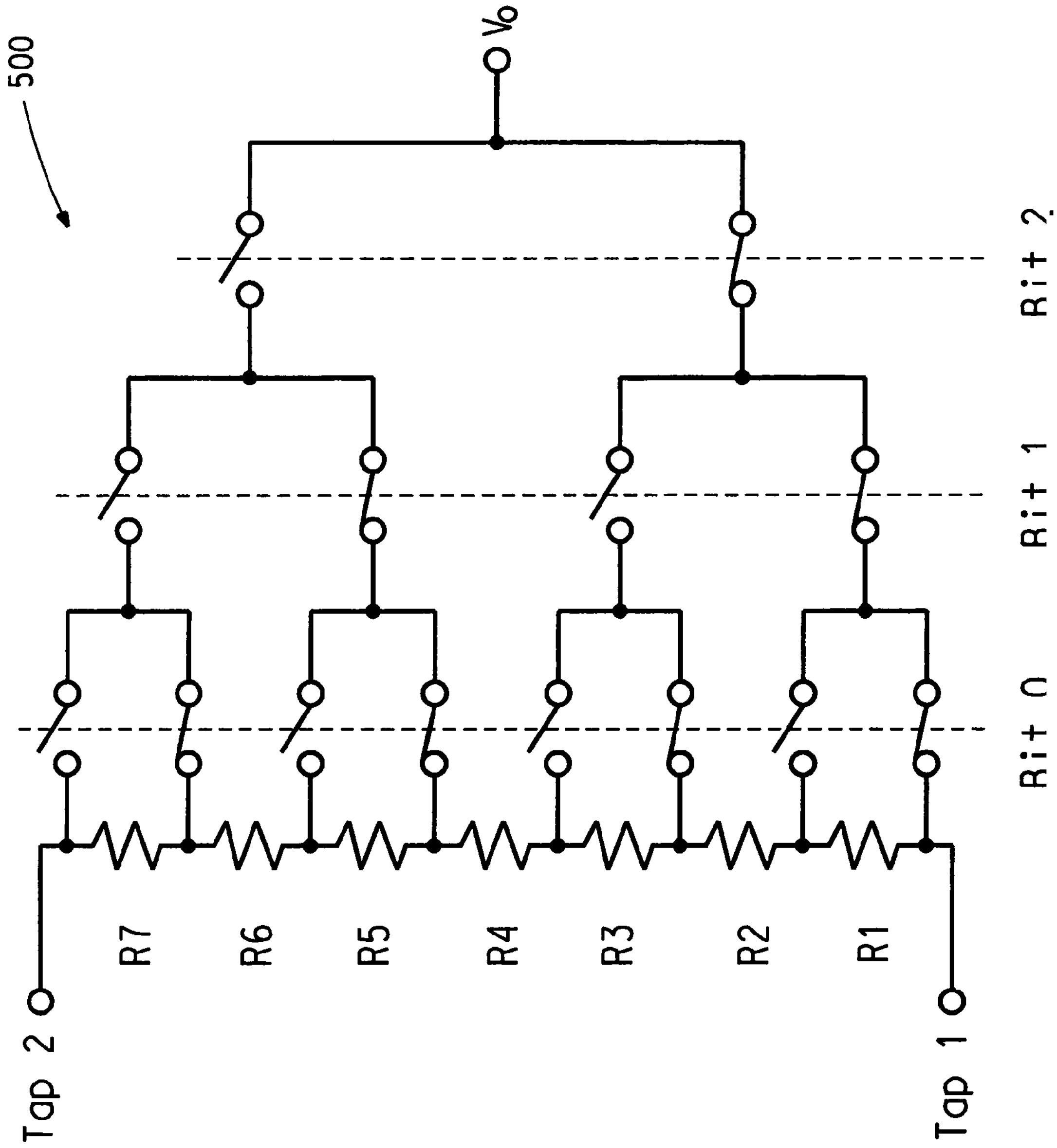
FIG. 5 includes a circuit diagram of a potentiometric D/A converter that can be used within a gamma correction unit for the data driver of FIG. 4.

In a specific embodiment, the first gamma correction unit 442, the second gamma correction unit 444, the third gamma correction unit 446, or any combination thereof can be a potentiometric D/A converter 500 as illustrated in FIG. 5. The potentiometric D/A converter 500 has a three-bit input as illustrated near the bottom of FIG. 5. A binary tree of switches then selects the point corresponding to an input. The switches include transistors. An example of a transistor that can be used includes a bipolar transistor (e.g., an npn bipolar transistor, a pnp bipolar transistor, or any combination thereof) or a field-effect transistor (e.g., a junction field-effect transistor (JFET), a metal-insulator-semiconductor field-effect transistor (MISFET) (e.g., a metal-oxide-semiconductor field-effect transistor (MOSFET), a metal-nitride-oxide-semiconductor (MNOS) field-effect transistor, or a thin-film transistor ("TFT")), or any combination thereof), or any combination of one or more bipolar transistors or one or more field-effect transistors. A field-effect transistor can be n-channel (n-type carriers flowing within the channel region) or p-channel (p-type carriers flowing within the channel region). A field-effect transistor can be an enhancement-mode transistor (channel region having a different conductivity type compared to the source/drain regions) or a depletion-mode transistor (channel and source/drain regions have the same conductivity type). A combination of one or more n-channel transistors, one or more p-channel transistors, one or more enhancement-mode transistors, or one or more depletion-mode transistors can be used.

In a specific embodiment, the resistors R1-R7 in the potentiometric D/A converter 500 have values that are set when the resistors R1-R7 are fabricated, and therefore, cannot be changed at a later time. For example, the resistors R1-R7 within the potentiometric D/A converter 500 can be fabricated at the same time as the other circuits for the data driver 342. In one embodiment, the values of the resistors R1-R7 could correspond to an initial value for a gamma function. If the resistors R1-R7 are designed for a $\gamma$=0.45, the resistors have the following values.

R7:R6:R5:R4:R3:R2:R1=80:88:99:113:137:183:500.

If the resistors R1-R7 are designed for a $\gamma$=2.0, the resistors have the following values.

R7:R6:R5:R4:R3:R2:R1=520:440:360:280:220:120:40.

The potentiometric D/A converter 500 has two taps. Tap 1 can have a voltage that is the minimum $V_o$ produced by the potentiometric D/A converter 500, and Tap 2 can have a voltage that is the maximum $V_o$ produced by the potentiometric D/A converter 500. In a specific embodiment, the signals provided to Tap 1 and Tap 2 are voltages. Table 1 includes the output signal ($V_o$) for different inputs (Bit2:Bit1:Bit0) to the potentiometric D/A converter 500.

TABLE 1

| Bit2:Bit1:Bit0 (binary) | $V_o$ |
|---|---|
| 111 | Tap 2 |
| 110 | (Tap 2 − Tap 1) × (R1 + R2 + R3 + R4 + R5 + R6)/ (R1 + R2 + R3 + R4 + R5 + R6 + R7) + Tap 1 |
| 101 | (Tap 2 − Tap 1) × (R1 + R2 + R3 + R4 + R5)/ (R1 + R2 + R3 + R4 + R5 + R6 + R7) + Tap 1 |
| 100 | (Tap 2 − Tap 1) × (R1 + R2 + R3 + R4)/ (R1 + R2 + R3 + R4 + R5 + R6 + R7) + Tap 1 |
| 011 | (Tap 2 − Tap 1) × (R1 + R2 + R3)/ (R1 + R2 + R3 + R4 + R5 + R6 + R7) + Tap 1 |
| 010 | (Tap 2 − Tap 1) × (R1 + R2)/ (R1 + R2 + R3 + R4 + R5 + R6 + R7) + Tap 1 |
| 001 | (Tap 2 − Tap 1) × R1/ (R1 + R2 + R3 + R4 + R5 + R6 + R7) + Tap 1 |
| 000 | Tap 1 |

In a specific embodiment, one or more values of one or more signals to Tap 1, Tap 2, or both can be changed at nearly any time. Because the value of the signal provided to Tap 1, Tap 2, or both can change, $V_o$, for values between the signals for Tap 1 and Tap 2, can also be changed. Therefore, $V_o$ can be changed even though the gamma function (determined by the selection of resistances for resistors R1-R7) has not changed.

Figure 6:
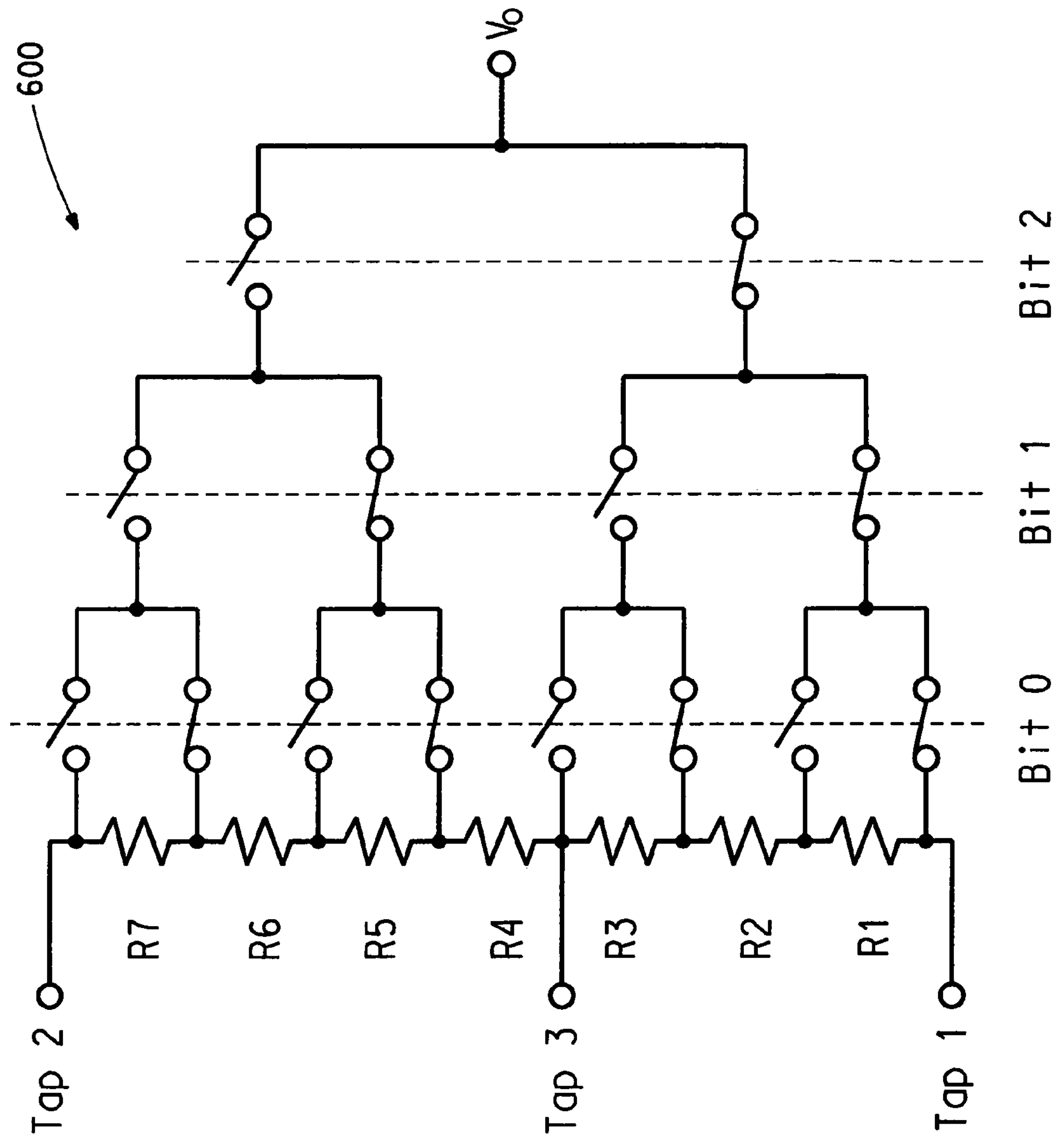
FIG. 6 includes a circuit diagram of another potentiometric D/A converter that can be used within a gamma correction unit for the data driver of FIG. 4.

In another embodiment, a potentiometric D/A converter 600 as illustrated in FIG. 6 can be used instead of the potentiometric D/A converter 500. The potentiometric D/A converter 600 has more than two taps. More specifically, the potentiometric D/A converter 600 includes Tap 1, Tap 2, and Tap 3. In a specific embodiment, the signals provided to Tap 1, Tap 2, and Tap 3 are voltages. Tap 1 can have a voltage that is the minimum $V_o$ produced by the potentiometric D/A converter 600, Tap 2 can have a voltage that is the maximum $V_o$ produced by the potentiometric D/A converter 600, and Tap 3 can have a voltage between the voltages on Tap 1 and Tap 2.

Similar to the potentiometric D/A converter 500 in FIG. 5, in one embodiment, the resistors R1-R7 in the potentiometric D/A converter 600 have values that are set when the resistors R1-R7 are fabricated, and therefore, cannot be changed at a later time, as previously described. In one embodiment, the values of the resistors R1-R7 could correspond to an initial value for a gamma function, similar to the potentiometric D/A converter 500 (two taps). Table 2 includes the output signal ($V_o$) for different inputs (Bit2:Bit1:Bit0) to the potentiometric D/A converter 600.

TABLE 2

| Bit2:Bit1:Bit0 (binary) | $V_o$ |
|---|---|
| 111 | Tap 2 |
| 110 | (Tap 2 − Tap 3) × (R4 + R5 + R6)/ (R4 + R5 + R6 + R7) + Tap 3 |
| 101 | (Tap 2 − Tap 3) × (R4 + R5)/ (R4 + R5 + R6 + R7) + Tap 3 |
| 100 | (Tap 2 − Tap 3) × R4/(R4 + R5 + R6 + R7) + Tap 3 |
| 011 | Tap 3 |
| 010 | (Tap 3 − Tap 1) × (R1 + R2)/(R1 + R2 + R3) + Tap 1 |
| 001 | (Tap 3 − Tap 1) × R1/(R1 + R2 + R3) + Tap 1 |
| 000 | Tap 1 |

Similar to the potentiometric D/A converter 500, one or more values of one or more signals provided to Tap 1 and Tap 2 may be changed with the potentiometric D/A converter 600.

Figure 7:
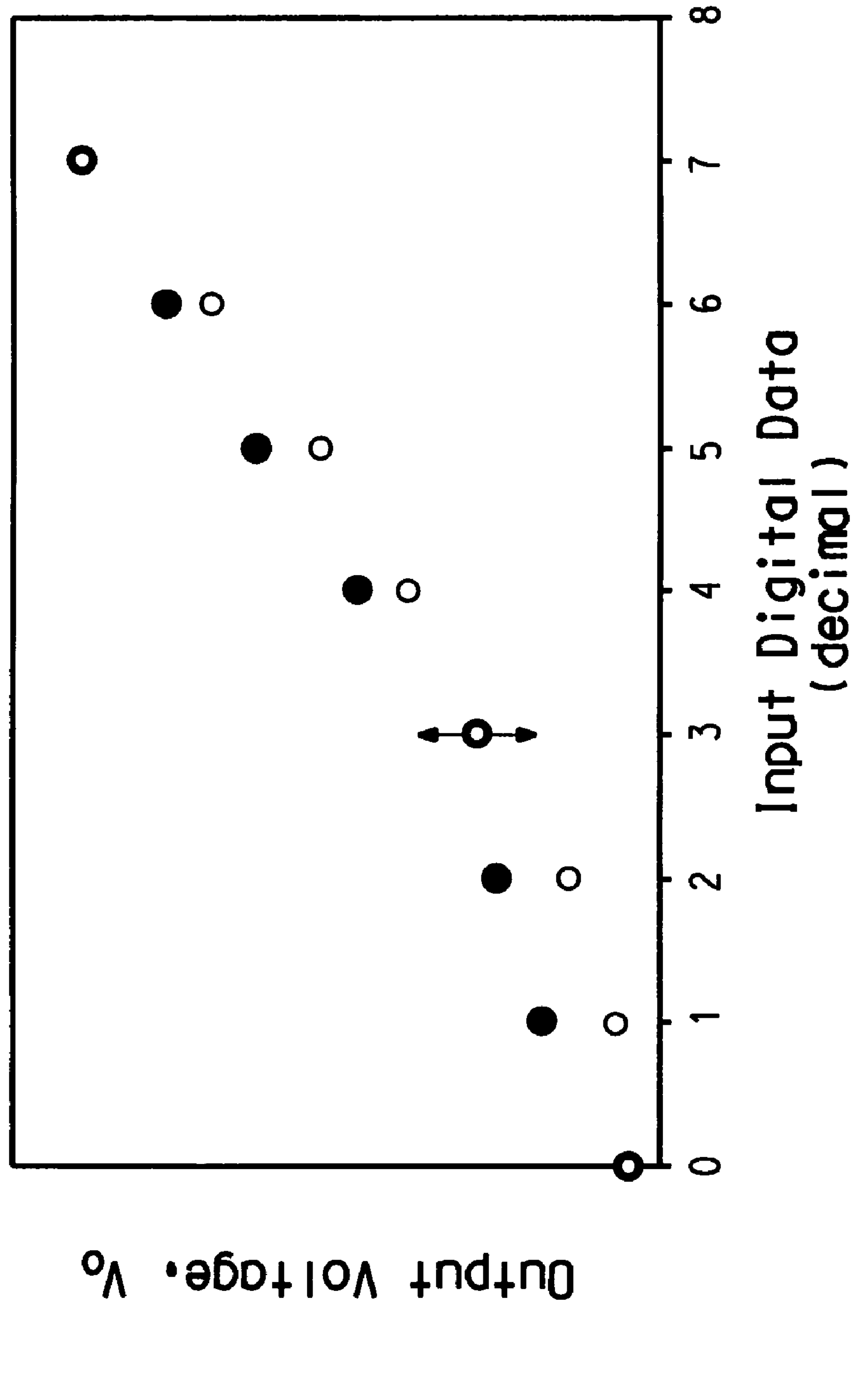
FIG. 7 includes a plot of an output signal as a function of the input signal for the potentiometric D/A converter of FIG. 6.

In another specific embodiment, the values of the signals to Tap 1 and Tap 2 do not change. However, the value of the signal to Tap 3 can be changed at nearly any time. Because the value of the signal provided to Tap 3 can change, $V_o$, for values between the signals for Tap 1 and Tap 2, can also be changed. FIG. 7 illustrates that the gamma function can be changed by changing the signal on Tap 3 (illustrated by arrows in FIG. 7). In FIG. 7, solid circles are for $\gamma$=0.45 and open circles are for $\gamma$=2.0. For each of Tap 1, Tap 2 and Tap 3, an open circle is superimposed on a solid circle (see Input Digital Data=0, 7 and 3, respectively, in FIG. 7). The change in signal on Tap 3 can be used to change the gamma function even though none of the values for resistors R1-R7 is changed. Therefore, the potentiometric D/A converter 600 can be used if the minimum $V_o$, maximum $V_o$, gamma function, or any combination thereof is changed.

Figure 8:
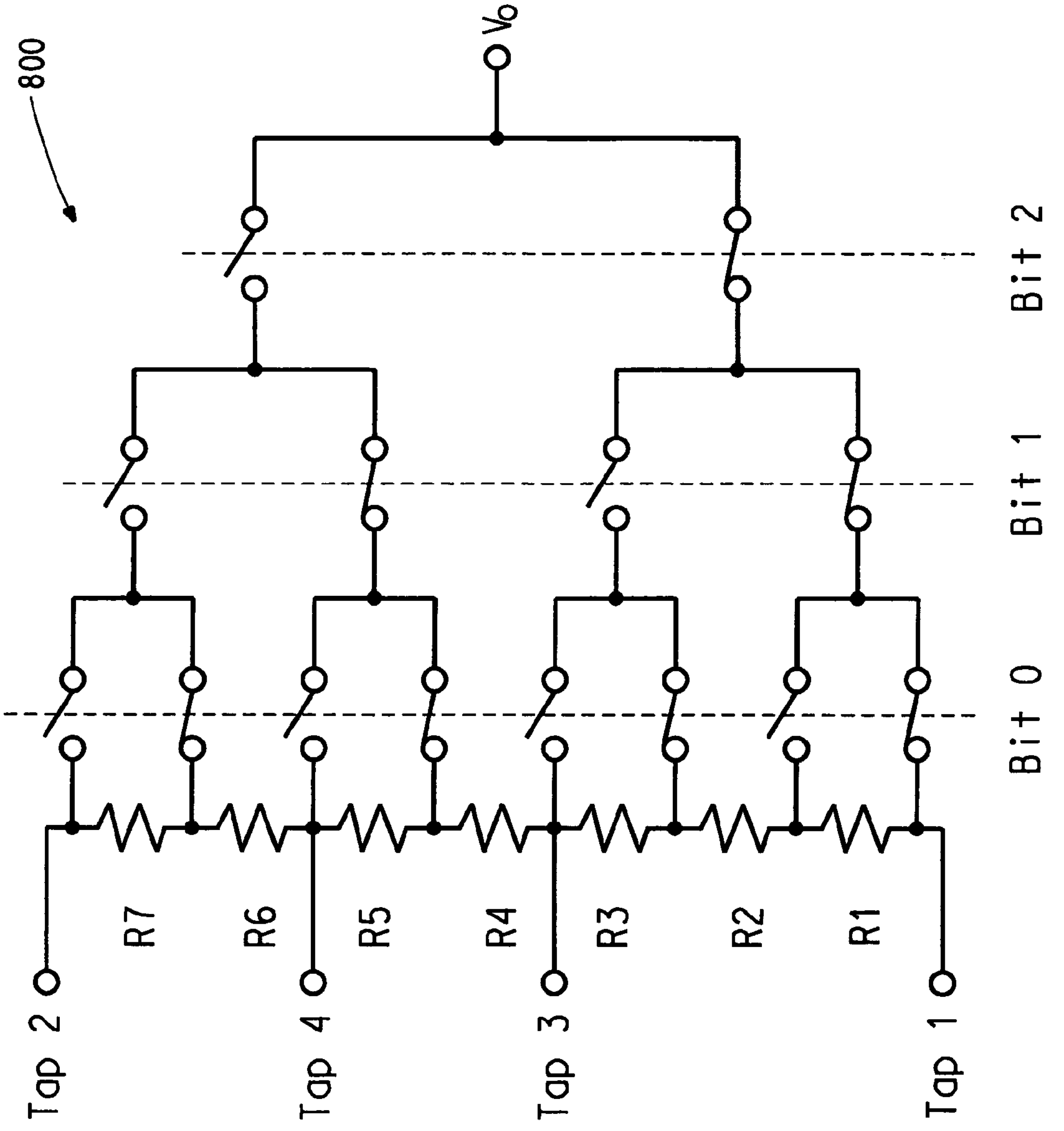
FIG. 8 includes a circuit diagram of an alternative potentiometric D/A converter that can be used within a gamma correction unit for the data driver of FIG. 4.

In still another embodiment, one or more additional taps can be provided. FIG. 8 includes an illustration of another design for a potentiometric D/A converter 800. As compared to the potentiometric D/A converter 600, the potentiometric D/A converter 800 includes Tap 4, which lies between R5 and R6. Alternatively, Tap 4 could be placed at other locations. For example, Tap 4 may be connected between any two resistors that are not otherwise connected to a tap (Tap 3 already exists between R3 and R4). Tap 4 could be located between R1 and R2, R2 and R3, R4 and R5, R5 and R6 (see FIG. 8), or R6 and R7. Other additional taps can be used but are not illustrated in FIG. 8.

The use of nearly any number of taps (Tap 1, Tap 2, Tap 3, Tap 4, other taps, or any combination thereof) allows external electronics to control the value(s) of the signal(s) to the tap(s). After reading this specification skilled artisans will understand that the gamma function (see FIG. 7) can be changed by adjusting the values of the signal(s) on the taps. The values of the signals provided to Tap 1, Tap 2, Tap 3, Tap 4, or any combination of taps can be changed at nearly any time, including after the electronic device has been fabricated.

3. Changing the Gamma Function

In one embodiment, the display 362 includes the array of radiation-emitting components. The radiation-emitting components can include blue light-emitting components (corresponding to the first gamma correction unit 442), green light-emitting components (corresponding to the second gamma correction unit 444), and red light-emitting components (corresponding to the third gamma correction unit 446). During a first time period, each of the first, second, and third gamma correction units 442, 444, and 446 have first, second, and third gamma functions. The array is operated during the first time period when the first, second, and third gamma functions are used. The display can be used by someone testing the electronic device 300 after it is fabricated as part of quality assurance, by a customer of the electronic device 300 manufacturer as part of quality control, by an end user of the electronic device 300, or by nearly anyone.

After the first time period, one or more of the first, second, and third gamma functions are changed to different value(s). Therefore, one, two, or all three of the first, second, or third gamma functions can be changed. The change may be performed to compensate for degradation or changing conditions of the display 362. The gamma functions can be changed by changing any one or more of Tap 1, Tap 2, Tap 3, etc. for the gamma corrections unit 442, 444, 446, or any combination thereof. Changing the signal on Tap 1 affects the minimum $V_o$, Tap 2 affects the maximum $V_o$, and intermediate tap(s), if any, effectively change the value of gamma. Therefore, changing any signal on any of the taps changes the gamma function for the gamma correction unit affected.

Because the gamma functions for the first, second, or third gamma correction unit 442, 444, or 446 can be changed independently of the other gamma correction units, better control over intensity and color balance can be achieved. The array can be operated during a second time period using the one or more changed gamma functions from the gamma correction unit(s), one or more gamma functions from the gamma correction unit(s) as used during the first time period, or a combination thereof.

4. Software/Hardware/Firmware

Figure 9:
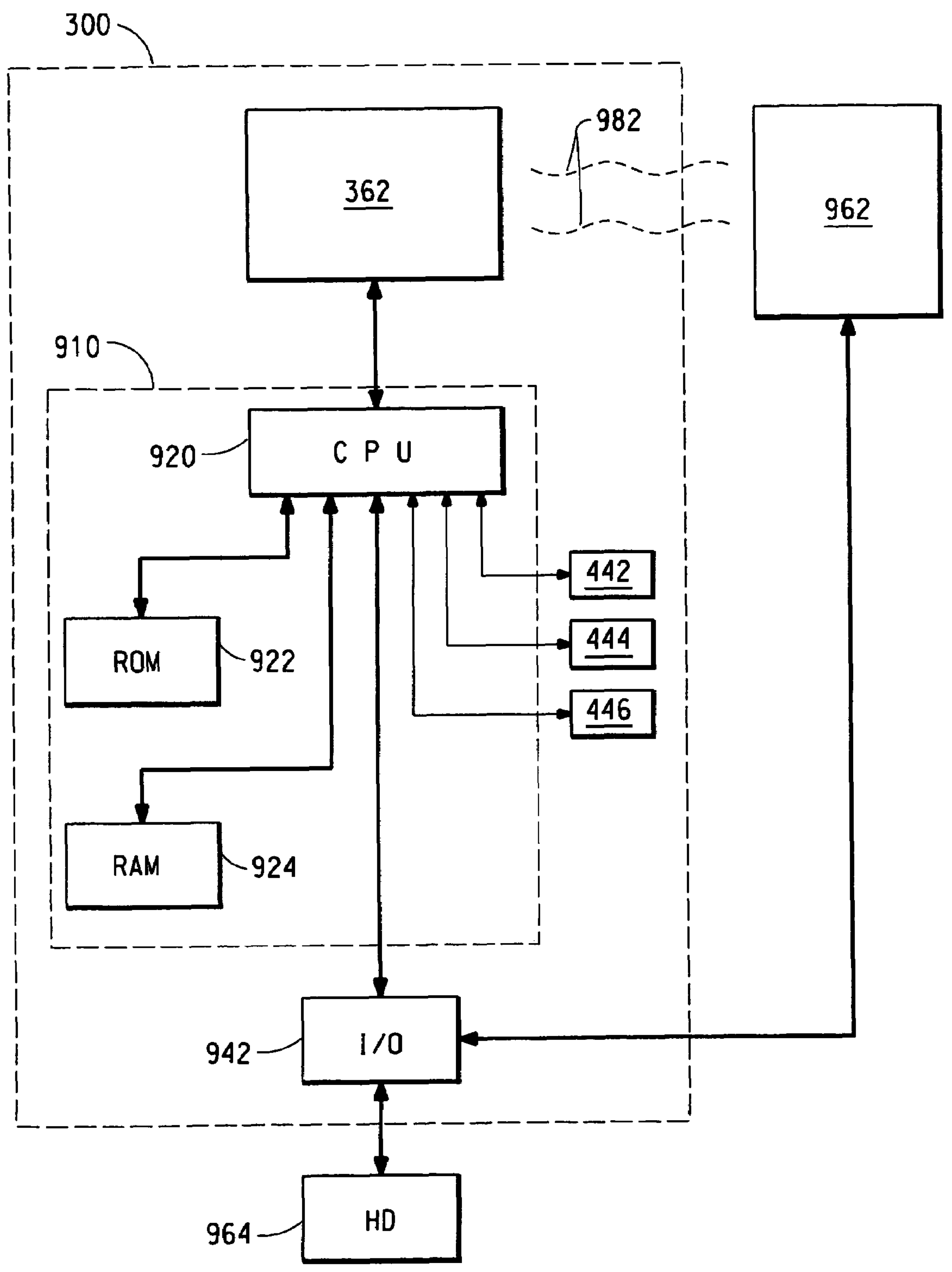
FIG. 9 includes an illustration of a schematic diagram of an electronic device including a data processing system.

The methodology previously described can be implemented in software, hardware, firmware, or any combination thereof. FIG. 9 includes an illustration of an electronic device 300 that includes the display 362, as previously described with respect to FIG. 1. The electronic device 300 also includes a data processing system 910 that is bi-directionally coupled to the display 362, and a radiation-sensing electronic device 962. In this embodiment, the radiation-sensing electronic device 962 is physically separate from the electronic device 300. In one embodiment, the radiation-sensing electronic device 962 is a digital camera. In another embodiment, the electronic device 300 includes one or more radiation-sensing components.

The data processing system 910 includes a central processing unit ("CPU") 920 and one or more of a read-only memory ("ROM") 922, and a random-access memory ("RAM") 924. The data processing system 910 is bi-directionally coupled to the first, second, and third gamma corrections units 442, 444, and 446. In a specific embodiment, the CPU 920 is bi-directionally coupled to the first, second, and third gamma corrections units 442, 444, and 446.

The electronic device 300 also includes one or more input/output ports ("I/O") 942. Devices that can be connected to the I/O 942 can include any one or more of a hard disk ("HD") 964, a keyboard, a monitor, a printer, an electronic pointing device (e.g., a mouse, a trackball, etc.), or the like. In the embodiment illustrated, the I/O 942 is bi-directionally coupled to the CPU 920, the radiation-sensing electronic device 962, and the HD 964.

Many alternative embodiments are possible. In one embodiment, the display 362 can be replaced by a sensor array that includes a plurality of radiation-sensing components, and the radiation-sensing electronic device 962 can be replaced by another electronic device that includes one or more radiation sources.

In another embodiment, part or all of the data processing system 910 may or may not reside outside of the electronic device 300. For example, the data processing system 910 can be a personal computer or a server computer. The actual configuration of hardware, software, firmware, or any combination thereof may, in part, depend on the actual electronic device. For example, the electronic device 300 can include a personal digital assistant, a laptop computer, a pager, a mobile phone (e.g., cellular phone), or the like. Therefore, the electronic device 300 may or may not include the HD 964. In still another embodiment, a database (not illustrated) may be connected to the electronic device 300 via at a port within at I/O 928, thereby potentially obviating the need for the HD 964.

After reading this specification, skilled artisans will appreciate that many other configurations are possible and to list every one of them would be nearly impossible. Also, the data processing system 910 or one of its variants can be used with other display and sensor configurations previously described.

The methods described herein may be implemented in suitable software code that may reside within the ROM 922, RAM 924, HD 964, or any combination thereof. In addition to the types of memories described above, the instructions in an embodiment may be contained on a different data processing system readable storage medium. Alternatively, the instructions may be stored as software code within a storage area network, magnetic tape, floppy diskette, electronic read-only memory, optical storage device, CD ROM, other appropriate data processing system readable medium or storage device, or any combination thereof. The memories described herein can include media that can be read by the CPU 920. Therefore, each of the memories includes a data processing system readable medium. For the purposes of this specification, firmware is considered a data processing system readable medium.

Portions of the methods described herein may be implemented in suitable software code that includes instructions for carrying out the methods. In one embodiment, the instructions may be lines of source code, object code, or assembly code. In a specific embodiment, the instructions may be lines compiled $C^{++}$, Java, or other language code. The code can be contained within one or more data processing system readable medium.

The functions of the data processing system 910 may be performed at least in part by another apparatus substantially identical to data processing system 910 or by a computer, server blade, or the like. Additionally, software with such code may be embodied in more than one data processing system readable medium in more than one data processing system.

Communications within the electronic device 300 or between the electronic device and other electronic devices, such as the radiation sensing electronic device 962 can be accomplished using radio frequency, electronic, or optical signals. When a user is at the electronic device 300, the electronic device 300 may convert the signals to a human understandable form when sending a communication to the user and may convert input from the user to appropriate signals to be used by the electronic device 300.

Figure 10:
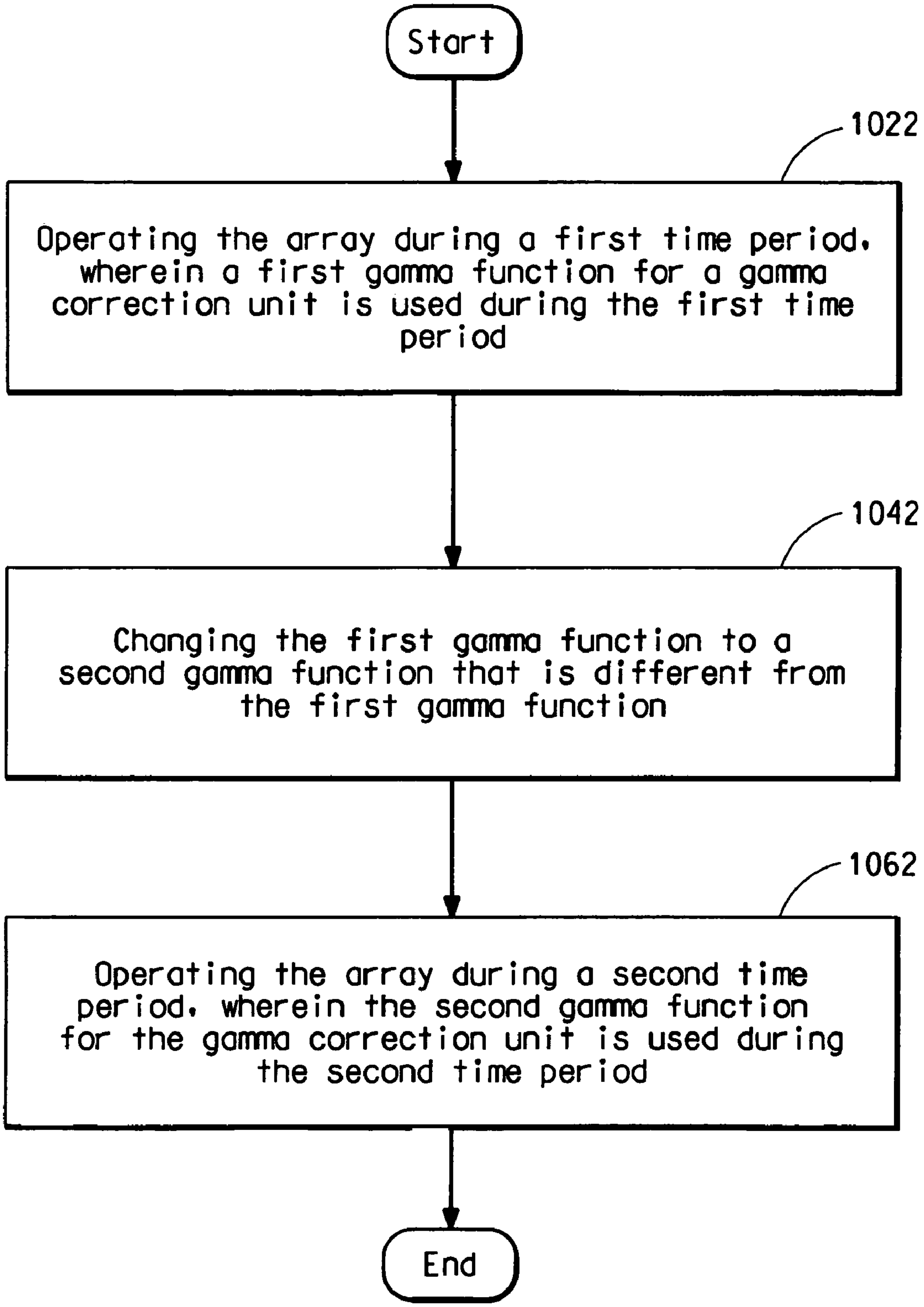
FIG. 10 includes a flow diagram for activities that can be carried out at least in part by the data processing system of FIG. 9.

Much of the methodology and its variants have been previously described. FIG. 10 includes a flowchart of one embodiment that can be used. The data processing system 910 can be programmed to perform the activities within the flow chart via code that can include instructions corresponding to the activities. The code can include an instruction for operating the array during a first time period, wherein a first gamma function for a gamma correction unit is used during the first time period (block 1022 in FIG. 10). The gamma correction unit may be any one or more of the gamma correction units 442, 444, and 446. Each may have its own first gamma function that may be the same or different as compared to one another. During operating the array during the first time period, each type of electronic component within the array may be tested individually. For example, data may be collected when only blue light-emitting components are active, when only green light-emitting components are active, or when only red light-emitting components are active.

In one embodiment, the information corresponds to data collected while the array is activated. Referring to FIG. 9, in one embodiment, radiation 982 is emitted by the display 362 and received by the radiation-sensing electronic device 962. The data may be collected by the radiation-sensing electronic device 962. The data from the radiation-sensing electronic device 962 is sent to and received by I/O 942 of the electronic device 300. The data may be stored in ROM 922, RAM 924, HD 964, or into another member (e.g., a database) that is not illustrated in FIG. 9.

The CPU 920 can access data collected during the first time period, access the data for the current gamma functions used by any one or more of the gamma correction units 442, 444, and 446. In one embodiment, the data corresponding to the gamma correction units 442, 444, and 446 includes signals on the taps to the gamma correction units 442, 444, and 446. A mathematical description of the output signals (e.g., Table 1 or Table 2 above) may also be accessed. Note that accessing may include obtaining the data as it is collected or retrieving such data from memory (e.g., ROM 922, RAM 924, HD 964, database, storage area network, etc.). Therefore, "accessing" should be broadly construed.

The code can also include an instruction for changing the first gamma function to a second gamma function that is different from the first gamma function (block 1042). In one embodiment, the CPU 920 may detect that blue light-emitting components may be degrading at a rate faster than for the green and red light-emitting components. For the first gamma correction unit 442, the first gamma function is changed to the second gamma function. In one embodiment, the ratio of maximum output intensity for blue:green:red is 1:2:1. In this embodiment, the first gamma function for the second gamma correction unit 444, third gamma correction unit 446, or both may also be changed. In one embodiment, changing the gamma correction function may be as simple as changing a signal on any one or more of the taps (e.g., Tap 1, Tap 2, Tap 3, etc.) for any one or more of the gamma correction units 442, 444, or 446.

The code can further include an instruction for operating the array during a second time period, wherein the second gamma function for the gamma correction unit is used during the second time period (block 1062). If desired, the process can be continued by iterating between operating and changing gamma functions.

The process described can be performed automatically without any human intervention. In another embodiment, the electronic device 300 may request the user of the electronic device 300 whether any one or more of the gamma correction functions for any one or more of the gamma correction units 442, 444, or 446 are to be changed.

3. Other Embodiments

The concepts described herein can be extended to nearly any electronic device that is to provide an output of an image. An example of the electronic device can include a display or a printer. The display may be active matrix or passive matrix. The display may include organic radiation-emitting components, inorganic radiation-emitting components (e.g., inorganic LEDs), or a combination thereof. The radiation-emitting electronic component may emit radiation outside the visible light spectrum (e.g., UV or IR).

Many different designs for the gamma correction units have been given. Note that the scope of the present invention is not limited to a gamma correction unit having resistors and switches and operated using voltages as signals. Many other designs are possible and can operate on other types of signals (e.g., current, optical signal, etc.) or combinations of signals.

The concepts could also be extended for nearly any number of bits input to a gamma correction unit. The number of electronic components (e.g., resistors, switches, etc.) and taps can, in part, depend on the number of bits within the input. In the OLED industry, 8-bit data streams are commonly used with displays. In the future, input data of even larger widths (more bits) may be used.

In another embodiment, the orientation of the output-signal drivers and scan lines can be reversed. Each output-signal driver can be coupled to a row of pixels, and each scan line can be coupled to a column of pixels. Regardless of orientation, the output-signal drivers and scan lines operate in substantially the same manner.

Portions or all of the methods described herein can be implemented in hardware, software, firmware, or any combination thereof. For software, instructions corresponding to the method can be lines of assembly code or compiled $C^{++}$, Java, or other language code. The code may reside on a data processing readable medium, a hard disk, a magnetic tape, a floppy diskette, an optical storage device, a networked storage device(s), a random access memory, or another appropriate data processing system readable medium or storage device. The data processing system readable medium may be read by a data processing system, such as a computer, a microprocessor, a microcontroller, or the like.

4. Advantages

The design of any one or more of the first, second, and third gamma correction units 442, 444, and 446 can be selected so that the gamma function(s) can be changed over time. Additionally, the gamma function for any gamma correction unit can be independently changed compared to the gamma function(s) of the other gamma correction unit(s). Therefore, ability to adjust the gamma functions at nearly ant time can help to improve better light intensity optimization and color balance as seen with the display 362.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

What is claimed is:

1. An electronic device comprising:

a first gamma correction unit;

a second gamma correction unit;

a first organic active layer; and a second organic active layer, wherein the first organic active layer corresponds to the first gamma correction unit, and the second organic active layer corresponds to the second gamma correction unit, the second organic active layer is different from the first organic active layer, wherein the first and second gamma correction units comprise a first tap, a second tap, a fifth tap and a sixth tap wherein:

the first tap provides a first lowest value for a first output value for the first gamma correction unit;

the second tap provides a first highest value for the first output value for the first gamma correction unit;

the fifth tap provides a second lowest value for a second output value for the second gamma correction unit;

the sixth tap provides a second highest value for a second output value for the second gamma correction unit; and the first gamma correction unit further comprises a third tap that provides a first intermediate value for the first output value for the first gamma correction unit, wherein:

the first intermediate value is between the first lowest value and the first highest value; and the third tap is configured to allow the first intermediate value to be changed after the electronic device has been fabricated; and wherein at least one tap is configured to allow the gamma function for the first and second gamma correction units to be changed after the electronic device has been fabricated.

2. The electronic device of claim 1, wherein the at least one tap is configured to allow a signal at the tap to be changed by an end user of the electronic device.

3. The electronic device of claim 1, wherein the electronic device is configured to automatically change the signal on the at least one tap.

4. The electronic device of claim 1, wherein:

the first gamma correction unit further includes a fourth tap that provides an additional first intermediate value for the first output value;

the additional first intermediate value is between the first lowest value and the first intermediate value of the third tap or is between the first intermediate value of the third tap and the first highest value; and the fourth tap is configured to allow the additional first intermediate value to be changed after the electronic device has been fabricated.

5. The electronic device of claim 1, wherein:

the electronic device comprises a third gamma correction unit;

the third gamma correction unit includes a seventh tap, an eighth tap, and a ninth tap, wherein:

the seventh tap provides a third lowest value for a third output value;

the eighth tap provides a third highest value for the third output value; and the ninth tap provides a third intermediate value for the third output value, wherein:

the third intermediate value is between the third lowest value and the third highest value; and the ninth tap is configured to allow the third intermediate value to be changed after the electronic device has been fabricated.

6. The electronic device of claim 5, further comprising:

a third organic active layer corresponding to the third gamma correction unit, wherein the third organic active layer is different from the first organic active layer and the second organic active layer.

7. The electronic device of claim 6, further comprising an array of radiation-emitting components that is part of a full-color OLED display.

8. A process for using an electronic device wherein the process comprises:

operating a first array of radiation emitting components corresponding to a first gamma correction unit having a first and a second gamma function;

operating the first array during a first time period, wherein the first gamma function for the first gamma correction unit is used during the first time period;

operating a second array of radiation emitting components corresponding to a second gamma correction unit having a third and a fourth gamma function;

operating the second array during the first time period, wherein the third gamma function for the second gamma correction unit is used during the first time period; wherein the first and second gamma correction units comprise a first tap, a second tap, a fifth tap and a sixth tap wherein:

the first tap provides a first lowest value for a first output value for the first gamma correction unit;

the second tap provides a first highest value for the first output value for the first gamma correction unit;

the fifth tap provides a second lowest value for a second output value for the second gamma correction unit;

the sixth tap provides a second highest value for a second output value for the second gamma correction unit; and the first gamma correction unit further comprises a third tap that provides a first intermediate value for the first output value for the first gamma correction unit, wherein:

the first intermediate value is between the first lowest value and the first highest value; and the third tap is configured to allow the first intermediate value to be changed after the electronic device has been fabricated;

changing the first gamma function to the second gamma function that is different from the first gamma function;

changing the third gamma function to the fourth gamma function that is different from the third gamma function;

operating the first and second arrays during a second time period, wherein the second gamma function for the first gamma correction unit is used during the second time period and the third gamma function for the second gamma correction unit is used during the second time period.

9. The process of claim 8, wherein changing the first gamma function to the second gamma function is performed by an end user of the electronic device.

10. The process of claim 8, wherein changing the first gamma function to the second gamma function is performed automatically by the electronic device.

11. A data processing system readable medium having code for using an electronic device comprising an army of radiation-emitting components and a first and a second gamma correction unit, wherein the first and second gamma correction units comprise a first tap, a second tap, a fifth tap and a sixth tap wherein:

the first tap provides a first lowest value for a first output value for the first gamma correction unit;

the second tap provides a first highest value for the first output value for the first gamma correction unit;

the fifth tap provides a second lowest value for a second output value for the second gamma correction unit;

the sixth tap provides a second highest value for a second output value for the second gamma correction unit; and the first gamma correction unit further comprises a third tap that provides a first intermediate value for the first output value for the first gamma correction unit, wherein:

the first intermediate value is between the first lowest value and the first highest value; and the third tap is configured to allow the first intermediate value to be changed after the electronic device has been fabricated; and, wherein the code is embodied within the data processing system readable medium, the code comprising:

an instruction for operating the array during a first time period, wherein a first gamma function for the first gamma correction unit is used during the first time period;

an instruction for changing the first gamma function to a second gamma function that is different from the first gamma function; and an instruction for operating the array during a second time period, wherein the second gamma function for the first gamma correction unit is used during the second time period.

12. The data processing system readable medium of claim 11, wherein the instruction for changing the first gamma function to a second gamma function comprises an instruction for changing a lowest value for the first gamma correction unit, a highest value for the first gamma correction unit, a value for gamma for the first gamma correction unit, or a combination thereof.

13. The data processing system readable medium of claim 11, the instruction for changing the first gamma function to the second gamma function comprises an instruction for changing the first intermediate value.

14. The data processing system readable medium of claim 13, wherein:

the first gamma correction unit further comprises a fourth tap that provides an additional first intermediate value for the first output value; and the additional first intermediate value is between the first lowest value and the first intermediate value of the third tap or is between the first intermediate value of the third tap and the first highest value.

15. The data processing system readable medium of claim 14, wherein the instruction for changing the first gamma function to the second gamma function further comprises an instruction for changing the additional first intermediate value.

16. The data processing system readable medium of claim 11, wherein:

the electronic device further comprises a third gamma correction unit;

a third gamma function for the second gamma correction unit and a fourth gamma function for the third gamma correction unit are used during the first time period; and the third gamma function for the second gamma correction unit and the fourth gamma function for the third gamma correction unit are used during the second time period.

17. The data processing system readable medium of claim 11, wherein:

the electronic device further comprises a third gamma correction unit;

a third gamma function for the second gamma correction unit and a fourth gamma function for the third gamma correction unit are used during the first time period; and the instruction for changing the first gamma function to the second gamma function further comprises an instruction for changing the third gamma function to a fifth gamma function, the fourth gamma function to a sixth gamma function, or both is executed before an instruction for operating the array during the second time period.

18. The data processing system readable medium of claim 11, wherein:

the electronic device further comprises a second gamma correction unit and a third gamma correction unit; and the array comprises:

a first organic active layer corresponding to the first gamma correction unit;

a second organic active layer corresponding to the second gamma correction unit, wherein the second organic active layer is different from the first organic active layer; and a third organic active layer corresponding to the third gamma correction unit, wherein the third organic active layer is different from the first organic active layer and the second organic active layer.

19. The data processing system readable medium of claim 18, wherein the array is part of a full-color OLED display.

* * * * *